J. C. BIDWELL.
Plows.

No. 147,233.  Patented Feb. 10, 1874.

Witnesses
Frederick Standish
James D. Kay

Inventor
John C. Bidwell
by his attys
Bakewell Christy & Kerr

UNITED STATES PATENT OFFICE.

JOHN C. BIDWELL, OF PITTSBURG, PENNSYLVANIA.

IMPROVEMENT IN PLOWS.

Specification forming part of Letters Patent No. 147,233, dated February 10, 1874; application filed July 23, 1873.

*To all whom it may concern:*

Be it known that I, JOHN C. BIDWELL, of Pittsburg, in the county of Allegheny and State of Pennsylvania, have invented a new and useful Improvement in Plows; and I do hereby declare the following to be a full, clear, and exact description thereof, reference being had to the accompanying drawing forming a part of this specification, in which—

Figure 1:
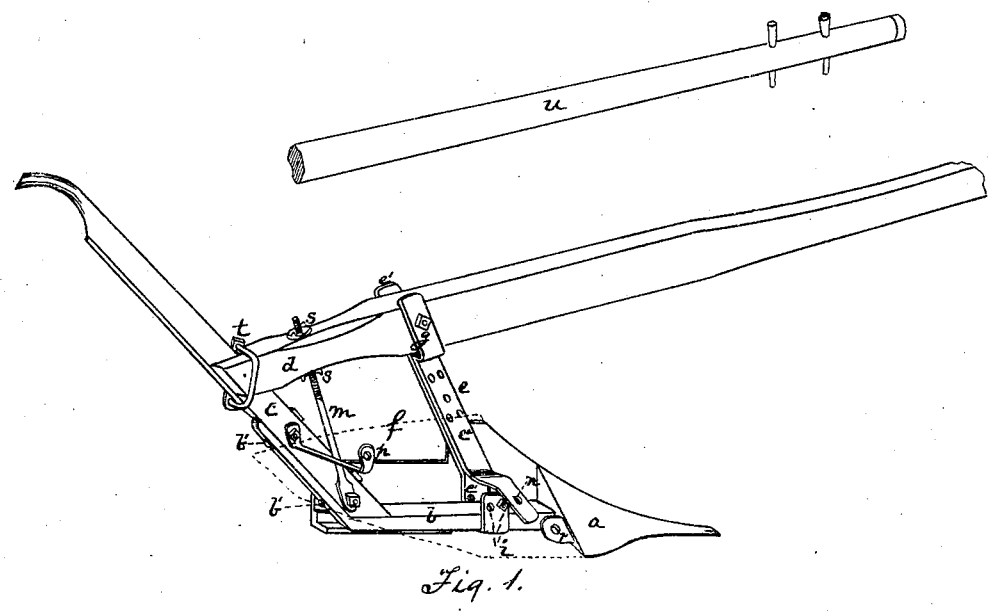
Figure 2:
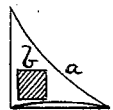

Figure 1 is a perspective view of my improved plow, the mold-board being shown by dotted lines; and Fig. 2 is a rear view of the share at the point where it joins the mold-board.

Like letters of reference indicate like parts in each.

My invention relates to an improvement in plows; and consists in the construction and attachment of the standard.

To enable others skilled in the art to make and use my invention, I will describe its construction.

The share $a$ is made solid and of triangular shape in cross-section. It is made by casting of cast-steel, and has a spur which runs back a short distance. By making the share of cast-steel and solid in cross-section, I secure a very heavy and remarkably strong share. After being cast the share is finished by drawing the point down to an edge, and welding to the spur a long tail or extension, $b$, made of wrought-iron or steel, which runs back to and and up the under side of the handle $c$, to which it is fastened by bolts, as shown at $b'$. This manner of fastening the handle $c$ to the rigid arm or tail of the share gives the plowman more complete control of the plow by the more powerful leverage he obtains. The standard $e$ is composed of two pieces of wrought-iron, $e^1$ and $e^2$, riveted together. At the upper end the two parts $e^1$ and $e^2$ separate and clasp the beam $d$, which is hung between them by a single bolt, $g$. At the lower end the parts $e^1$ and $e^2$ are again spread. One part, $e^1$, extends around and grasps the tail $b$, in which position it is held by the bolts $i$. The other part, $e^2$, is bent over and fastened to the mold-board $f$ (shown by dotted lines) by a bolt through the hole $n$. This part operates as a brace to the mold-board, which is further secured to the brace $p$ and lug $r$. Bolted to the handle $c$ is a threaded rod or screw, $m$, which, extending upward, passes through the rear end of the beam $d$. At this point it is provided with two nuts, $s$, one on each side of the beam. This device is intended for the adjustment of the beam, so as to give any desired depth of furrow. The beam is pivoted at $g$, and by screwing the nuts $s$ either up or down, so as to give the draft-beam a greater or less inclination to the plow, a greater or less depth of furrow will be cut.

The beam is fastened to the handle by a fastening, $t$, of the usual kind.

This plow may, if it is desired, be furnished with two handles, the second one being secured to the rear end of the mold-board, and to the handle $c$, by bolts.

In many countries to which American plows are exported the plow is drawn by oxen by means of a tongue. This plow is especially adapted to such use, and when designed for exportation I fit it with a tongue, $u$. For ordinary use, it has a beam of the usual construction.

What I claim as my invention, and desire to secure by Letters Patent, is—

1. The standard $e$, composed of two wrought-iron bars joined in the center and parted at the ends, forming at the upper end a crutch sustaining the beam $d$, and at the lower end grasping the tail $b$ with one part, $e^1$, and sustaining and bracing the mold-board with the other part, $e^2$.

2. The standard $e$, constructed as described, in combination with the solid point $a$ and extension $b$, substantially as described.

In testimony whereof I, the said JOHN C. BIDWELL, have hereunto set my hand.

JOHN C. BIDWELL.

Witnesses:
E. T. CASSIDY,
JAMES I. KAY.